United States Patent [19]

Steelhammer et al.

[11] 4,310,438

[45] Jan. 12, 1982

[54] POLYETHYLENEAMINES AS SULFITE ANTIOXIDANTS

[75] Inventors: Joe C. Steelhammer, Lansdale, Pa.; Ian D. Morrison, Webster, N.Y.; Lawrence S. Wittenbrook, Doylestown, Pa.

[73] Assignee: Betz Laboratories, Inc., Trevose, Pa.

[21] Appl. No.: 25,304

[22] Filed: Mar. 30, 1979

[51] Int. Cl.$^3$ ............................................. C09K 15/16
[52] U.S. Cl. ................................. 252/401; 252/188; 423/243; 422/14
[58] Field of Search ............... 252/401, 188, 180, 181; 423/242, 243; 210/59; 422/14, 16

[56] References Cited

U.S. PATENT DOCUMENTS

| | | | |
|---|---|---|---|
| 3,193,009 | 7/1965 | Wallace et al. | 166/272 |
| 3,808,325 | 4/1974 | Urban | 210/59 X |
| 3,918,521 | 11/1975 | Snavely et al. | 423/242 X |
| 4,019,859 | 4/1977 | Lavin et al. | 252/389 X |

*Primary Examiner*—J. L. Barr
*Attorney, Agent, or Firm*—Alexander D. Ricci; Bruce E. Peacock

[57] ABSTRACT

A method for reducing the oxidation of sulfite to sulfate in a sulfite-containing aqueous medium is disclosed and comprises adding to the medium water-soluble polyethyleneamine having at least one secondary amine and two primary amines.

12 Claims, No Drawings

POLYETHYLENEAMINES AS SULFITE ANTIOXIDANTS

The present invention is drawn to the use of certain water-soluble organic amino compounds and their water soluble salts as sulfite antioxidants in aqueous mediums. More specifically, the present inventors have discovered that the sulfite to sulfate oxidation reaction in a sulfite-containing aqueous medium can be inhibited or reduced by the use of water-soluble polyethyleneamines containing at least one secondary amine moiety and two primary amine moieties. In terms of a chemical formula these compounds can be described as follows:

$$NH_2(CH_2CH_2NH)_xH, \qquad (I)$$

where x is greater than 1. These linear compounds are seen to be particularly useful as sulfite antioxidants for the aqueous scrubber mediums found in sulfur dioxide gas scrubbers.

A common problem faced in industry today is the removal of sulfur dioxide, an environmental pollutant formed by the oxidation of sulfur or sulfur-containing substances, from industrial exhaust gases. This pollutant is found as a component in various waste gases such as blast furnace gases, emission gases from certain chemical factories, and flue gases from coal or oil-burning furnaces used in utility plants. For example, in U.S. Pat. No. 3,918,521, to Snavely et al, a steam injection oil recovery system is disclosed wherein the flue gas from an oil-burning steam generator contains sulfur dioxide.

One widely accepted method for attacking this problem of sulfur dioxide removal is the use of wet scrubber systems in which sulfur dioxide-containing gases are intimately contacted with a scrubbing liquor. The scrubbing liquor is selective for sulfur dioxide due to the addition of certain chemicals such as lime, limestone or magnesium oxide.

When the sulfur dioxide-containing gas is contacted with the scrubbing liquor, these noted chemicals react with the sulfur dioxide to form a sulfite-containing reaction product which remains with the liquor, permitting the resulting relatively sulfur dioxide-free exhaust gas to pass on through the process stream. The thus spent scrubbing liquor is then circulated through a regeneration sidestream in which, as the name implies, the sulfur dioxide-selective chemicals are regenerated; and the thus replenished scrubbing liquor is recirculated into the wet scrubber system. It is due to the oxidation of this sulfite-containing reaction product in the spent scrubbing liquor that many problems arise, as will be illustrated below.

One major type of wet scrubber system for removing sulfur dioxide is known as the "limestone slurry system" in which the scrubbing liquor contains limestone as a sulfur dioxide-selective chemical. Upon contacting the sulfur dioxide-containing gas with the limestone slurry, sulfur dioxide is removed according to the reaction:

$$CaCO_3 + SO_2 + \tfrac{1}{2}H_2O \rightarrow CaSO_3 \cdot \tfrac{1}{2}H_2O + CO_2 \qquad (1)$$

A major problem experienced with these systems is related to a secondary reaction in which the aqueous oxidation of sulfite to sulfate in the scrubbing liquor occurs. In the pH range of most scrubbers, the reaction is:

$$HSO_3^- + \tfrac{1}{2}O_2 \rightarrow SO_4^{--} + H^+, \text{ or} \qquad (2)$$

$$SO_3^{--} + \tfrac{1}{2}O_2 \rightarrow SO_4^{--} \qquad (3)$$

The negative consequences of this oxidation are several-fold as follows:

1. Calcium sulfate, a most tenacious scale, is formed and precipitates or crystallizes on various surfaces throughout the system. In contrast, the formation of calcium sulfite precipitate can be controlled in the scrubber by relying on the usually lower pH and hence favoring the formation of the more soluble bisulfite species:

$$CaSO_3 + H_2SO_3 \rightarrow Ca^+ + 2HSO_3^- \qquad (4)$$

2. The pH of the scrubbing liquor drops (Equation 2), thus reducing the scrubber efficiency.

3. Examination of scale surfaces in scrubbers occasionally shows calcium sulfate to be the initial depositing species with other constituents forming on the calcium sulfate deposit.

A second major type of web scrubber system for removing sulfur dioxide from a gas is known as the "double-alkali system" which contains a scrubbing loop and a separate precipitation loop. This system utilizes a sodium based scrubbing loop in which sulfur dioxide is removed from exhaust gas according to:

$$Na_2SO_3 + SO_2 + H_2O \rightarrow 2NaHSO_3 \qquad (5)$$

If sodium hydroxide is also used, sulfur dioxide is removed according to:

$$2NaOH + 2SO_2 \rightarrow 2NaHSO_3 \qquad (6)$$

In the precipitation loop, the spent scrubbing liquor is regenerated by treatment with lime and soda ash to precipitate the sulfite reaction product according to:

$$2NaHSO_3 + Ca(OH)_2 \rightarrow CaSO_3 + Na_2SO_3 + 2H_2O \qquad (7)$$

There are, indeed, drawbacks in the double-alkali system related to the oxidation of sulfite to sulfate in the scrubbing liquor. As opposed to the bisulfite ion, the sulfate ion is no longer regenerable and is of no further use in the process. This necessitates purging of the sulfate from the scrubbing liquor to avoid calcium sulfate scale. This purging results in the loss of sodium compounds from the scrubbing liquor, which compounds must be replaced at considerable expense.

The present invention is drawn to the reduction of oxidation of sulfite to sulfate in a sulfite-containing aqueous medium. More specifically, the present invention is drawn to the reduction of oxidation of sulfite to sulfate in a sulfite-containing aqueous medium by treating the medium with water-soluble polyethyleneamine having at least one seondary amine and two primary amines. These compounds are considered to be particularly useful as antioxidants in aqueous gas scrubber mediums. Any reference herein to polyethyleneamine is intended to include mixtures of such compounds.

The polyethyleneamines are exemplified by the following:

$$H_2NCH_2CH_2NHCH_2CH_2NH_2 \qquad (II)$$

While this compound contains two primary amine moieties, that alone is not considered to be sufficient since simple primary amines, e.g., H2NCH2OH and H2NCH2CH2NH2, have proven to be relatively inactive. Also, while compound (II) contains a secondary amine, simple secondary amines, e.g., (HOCH2CH2)2NH and (CH3CH2)2NH, also have proven to be relatively inactive.

In terms of a general chemical formula, the polyethyleneamines according to the present invention can be described by the following:

  (I)

where x is greater than 1. The phrase "water-soluble polyethyleneamines" is intended to, of course, include any of the well-known water-soluble salts of the compounds. The compound is preferably fed as an aqueous solution by any well-known means.

As already noted with respect to formula (I), x must be greater than 1. When tests were conducted with ethylenediamine, where x=1, this compound failed to demonstrate sulfite antioxidant efficacy under the conditions of the test.

With respect to the upper limit for x, it is the present inventors' belief that any water-soluble polyethyleneamine corresponding to formula (I), where x is greater than one, would work, with the only restrictions being related to such known factors as the availability, solubility, cost of the compound and its ease of handling and use. Based on such factors, the preferred upper limit is about 10, with 5 representing the most preferred upper limit. From an overall performance point of view, tetraethylenepentamine (where x=3) proved to be the most desirable additive of those tested.

The amount of treatment added to a particular aqueous medium would, of course, depend on such known factors as the nature and severity of the problem being experienced. For example, the higher the solids content of the aqueous medium, the greater the treatment dosage should be. Treatment levels could be as low as about 0.5 parts of active polyethyleneamine additive (weight basis) per million parts of sulfite-containing aqueous medium, with about 1 ppm being the preferred lower limit. On the other hand, the upper limit could be as high as about 100 parts of active additive per million parts of aqueous medium, with about 50 ppm being preferred. Based on economic factors, 10 ppm is considered to be the most preferred upper limit.

It should be noted that various other amines are known to be sulfite antioxidants at higher pH's of about 9.5. However, at lower pH's of about 6.5, under which conditions sulfur dioxide gas scrubbers typically operate, only those particular amines according to the present invention demonstrated antioxidant efficacy (with the exception of an aromatic amine as noted below). Accordingly, the polyethyleneamines are considered to be unusual in that they are effective over a wide pH range as compared to these other amines, and they are considered to be particularly distinctive from other amines in their antioxidant efficacy in an acidic medium. For these reasons, according to a preferred embodiment of the present invention, the sulfite-containing aqueous medium has a pH of about 4.5 to 7.5.

EXAMPLES

EXAMPLE 1

The efficacy of numerous compounds in reducing the amount of sulfite oxidation was compared in a first series of tests. These tests were based on the fact that, as a sulfite solution oxidizes to sulfate, the pH drops. This drop in pH is due to the higher $pK_a$ (smaller disassociation constant) for bisulfite as compared to bisulfate. By simple calculation the pH is used to calculate the change in sulfite concentration. The sulfite oxidation rate is proportional to the sulfite concentration at sulfite concentrations below 0.02 molar. Those antioxidants that cause the smallest effective oxidation rate constants to result in aqueous sulfite solutions are considered to be the best oxidation inhibitors.

To measure the rate of oxidation of aqueous sulfite, $CO_2$-free air is bubbled through a solution of sodium sulfite. For slow rates of bubbling the rate of oxidation is limited by the rate of $O_2$ dissolution. For sufficiently high rates of air flow, the rate of oxidation depends on the total sulfite concentration and inhibitors or catalysts present. All tests were conducted at high air flow. While the sulfite concentration can be followed by titrating samples of the solution for total sulfite at various times, this method has drawbacks in that many titrations must be performed to obtain accurate rate constants. However, following the suggestion by L. C. Schroeter (*Sulfur Dioxide*, Pergamon press, 1966, p. 62), the relationship between sulfite ion concentration and pH can be derived. The change in pH with oxidation is due to bisulfate being a much stronger acid than bisulfite so that oxidation results in the release of a proton. After a straightforward but tedious calculation, the following relation is obtained between total sulfite concentration, $S_t$; initial sulfite concentration, $S_i$; initial hydrogen ion concentration, $[H_i^+]$; final hydrogen ion concentration, $[H_f^+]$; second ionization constant of sulfurous acid, K; and water dissociation constant, Kw:

$$\frac{S_t}{S_i} = \frac{[H_i^+]\{[H_f^+] + K\}}{[H_f^+]\{[H_i^+] + K\}} + \frac{1}{S_i}\left\{ K_w \frac{[H_f^+] + K}{[H_f^+]} \left( \frac{1}{[H_f^+]} - \frac{1}{[H_i^+]} \right) - \frac{[H_f^+] - [H_i^+]}{[H_f^+]} \{[H_f^+] + K\} \right\}.$$

This equation is valid when no other buffering reactions are taking place in the solution. A solids-free $Na_2SO_3$ solution would be an example.

In the pH range 4 to 7 and $S_i = 0.02$ M $Na_2SO_3$, the conditions of the test, the second term is negligible, giving as a suitable approximation:

$$\frac{S_t}{S_i} = \frac{[H_i^+]}{[H_f^+]} \frac{[H_f^+] + K}{[H_i^+] + K}$$

This simplified formula can be derived by assuming that the bisulfite ion concentration does not change during oxidation. All tests were conducted at 25° C.

The decrease in total sulfite ion concentration was found to be first order in sulfite so that the first order rate constants are easily calculable by a least squares fit of the log of the sulfite ion concentration versus time to a straight line. Since the relative rates of oxidation are sufficient to compare oxidation inhibition abilities, all the rates of oxidation calculated are divided by the rate of oxidation of a control of deionized water, $1.52 \times 10^{-2}$ min$^{-1}$.

Experimental Method for First Series of Tests

Carbon dioxide-free, water saturated air was produced by bubbling compressed air through the following in succession:
(a) 50% NaOH solution
(b) concentrated $H_2SO_4$
(c) glass wool
(d) pH=10 buffer
(e) glass wool
(f) flow meter
(g) reaction flask The solution to be oxidized was prepared by adding the treatment to a stock solution of $Na_2SO_3$ and diluting to 0.02 M (250 ml), adjusting pH with minimum necessary stirring to pH=6.5 with 1 N $H_2SO_4$. The reaction flask was clamped into a constant temperature bath at 25° C., a pH electrode and fritted glass bubbler were lowered into the flask, and the air flow was set to 3 liters per minute. The pH of the oxidizing solution was recorded with time for 15-18 minutes at which time the pH was decreasing only very slowly. The log of the fraction of total sulfite remaining was plotted versus time and the first order rate of oxidation was calculated by a least squares fit.

The results of the tests are reported below in Tables 1 and 2. In Table 1, various compounds are compared at molar dosages, and, in Table 2, the results are reported in terms of parts per million dosages. It should be kept in mind that the lower the rate, the better the compound is considered to be. Also, it is noted that values greater than one indicate that the oxidation is actually being accelerated while values less than one indicate deceleration.

TABLE 1

| Compound | Dosage (moles/liter) | Relative Rate of Oxidation |
|---|---|---|
| hydroquinone | $5 \times 10^{-5}$ | 1.29 |
| diethanolamine | $5 \times 10^{-5}$ | 1.18 |
| triethanolamine | $5 \times 10^{-5}$ | 0.99 |
| ethylenediamine | $5 \times 10^{-5}$ | 0.99 |
| triethylamine | $5 \times 10^{-5}$ | 0.80 |
| propylenediamine | $5 \times 10^{-5}$ | 1.22 |
| 2-(2-aminoethylamino)ethanol | $5 \times 10^{-5}$ | 0.51 |
| ammonium hydroxide | $5 \times 10^{-5}$ | 0.28 |
| diethylenetriamine | $5 \times 10^{-5}$ | 0.015 |
| triethylenetetramine | $5 \times 10^{-5}$ | 0.02 |
| tetraethylenepentamine | $1.25 \times 10^{-5}$ | 0.02 |
|  | $2.5 \times 10^{-5}$ | 0.02 |
| pentaethylenehexamine | $6.25 \times 10^{-6}$ | 0.03 |
|  | $1.25 \times 10^{-5}$ | 0.00 |
| dipropylenetriamine | $5 \times 10^{-5}$ | 1.43 |
| piperazine | $5 \times 10^{-5}$ | 1.04 |

TABLE 2

| Compound | Dosage (parts per million) | Relative Rate of Oxidation |
|---|---|---|
| diethylenetriamine | 0.6 | 0.45 |
|  | 1.3 | 0.33 |
|  | 2.6 | 0.15 |
|  | 5.2 | 0.015 |
| triethylenetetramine | 0.1 | 0.38 |
|  | 0.9 | 0.12 |
|  | 1.83 | 0.03 |
|  | 3.7 | 0.03 |
|  | 7.3 | 0.02 |
| tetraethylenepentamine | 0.02 | 1.06 |
|  | 0.09 | 0.40 |
|  | 0.2 | 0.00 |
|  | 1.2 | 0.03 |
|  | 2.4 | 0.02 |
|  | 4.7 | 0.02 |
| pentaethylenehexamine | 0.02 | 1.21 |
|  | 0.1 | 0.36 |
|  | 0.2 | 0.00 |
|  | 1.45 | 0.03 |
|  | 2.9 | 0.00 |

It is seen to be quite clear from Table 1 that, as compared to other materials tested, the performance of the polyethyleneamines according to the present invention were far superior. This comparison is seen to be particularly significant with respect to the othe types of amine compounds tested. However, it should be noted that the polyethyleneamines were not the only type of amine which performed well in that alkylated aromatic amines, such as N, N'-dimethyl-p-phenylene diamine sulfate also performed well.

EXAMPLE 2

In a sulfur dioxide gas scrubber, the aqueous scrubber medium will most often contain fly ash solids. While these aren't the only solids present, possible interference of fly ash with the antioxidant treatment is a primary concern. Accordingly, a second series of tests, as described below, were conducted to determine the fly ash effects, if any, on the polyethyleneamine treatments.

Experimental Method for Second Series of Tests

An aqueous solution was prepared containing 0.02 Molar sodium sulfite. To the resulting sulfite solution was added fly ash in the appropriate amount. The fly ash-containing sulfite solution was then allowed to stand for about 10 minutes, and the pH was adjusted to 6.5. Then, 400 ml test samples of the reulting slurry were withdrawn and introduced into an Erlenmeyer flask. Carbon dioxide-scrubbed air was then bubbled through the test sample at a rate of 3 liters per minute. Every 10 minutes for a period of 30 minutes aliquots were withdrawn with a hypodermic needle, and standard iodine-iodate titration was performed to determine the remaining sulfite in the slurry. This analytical method of sulfite determination is different from that used earlier, but was necessitated by the buffering capacity of the fly ash.

The results of these tests are reported in Tables 3 and 4 below in terms of percent sulfite oxidation at the time intervals indicated. In Table 3 are reported the results of tests conducted in a 0.1% fly ash slurry (1000 ppm fly ash), and in Table 4 are reported the results of tests conducted in a 1% fly ash slurry (10,000 ppm fly ash). The polyethyleneamine tested was tetraethylenepentamine (TEPA).

TABLE 3

| Aqueous Sulfite Slurry Containing 0.1% Fly Ash | | |
|---|---|---|
| Dosage of TEPA (ppm) | Time (minutes) | % Oxidation |
| none | 10 | 31 |
| 2 | 10 | 19 |
| 5 | 10 | 3 |
| none | 20 | 41 |
| 2 | 20 | 36 |
| 5 | 20 | 5 |
| none | 30 | 48 |
| 2 | 30 | 40 |

TABLE 3-continued

Aqueous Sulfite Slurry Containing 0.1% Fly Ash

| Dosage of TEPA (ppm) | Time (minutes) | % Oxidation |
| --- | --- | --- |
| 5 | 30 | 8 |

TABLE 4

Aqueous Sulfite Slurry Containing 1% Fly Ash

| Dosage of TEPA (ppm) | Time (minutes) | % Oxidation |
| --- | --- | --- |
| none | 10 | 37.5 |
| 1 | 10 | 40.5 |
| 5 | 10 | 39 |
| 20 | 10 | 8 |
| 50 | 10 | 7.5 |
| 100 | 10 | 5.5 |
| none | 20 | 41.5 |
| 1 | 20 | 44 |
| 5 | 20 | 43 |
| 20 | 20 | 13.5 |
| 50 | 20 | 11.5 |
| 100 | 20 | 9 |
| none | 30 | 45 |
| 1 | 30 | 47 |
| 5 | 30 | 45 |
| 20 | 30 | 16.5 |
| 50 | 30 | 14.5 |
| 100 | 30 | 10.5 |

As can be seen from Tables 3 and 4, despite the presence of fly ash the polyethyleneamine compound was still efficacious, even though the treatment dosage had to be increased as the fly ash content increased. It is believed that fly ash might be encountered in scrubber slurries in amounts ranging from about 100 to 20,000 parts of fly ash per million parts of aqueous slurry.

Additional testing has indicated that the polyethyleneamine dosage level may have to be increased due to anyone of the following factors:

1. the presence of heavy metals,
2. an increase in scrubber medium temperature,
3. high silica content of the fly ash,
4. the presence of calcium sulfate in the scrubber medium, and
5. the presence of soluble cations which either catalyze the above sulfite reactions or are themselves reduced as part of the sulfite oxidation reaction.

On the basis of long term stability and the effects of a solution of high ionic strength, tetraethylenepentamine and the higher homologs of the polyethyleneamines are preferred.

A preferred embodiment of the treatment is comprised of on a weight basis:

13.3% tetraethylenepentamine,
13.3% polyethylene glycol, and
73.4% water. The glycol is used as a thermal stabilizer.

Having thus described our invention, we claim:

1. A method for reducing the amount of oxidation of sulfite to sulfate in a sulfite-containing aqueous gas scrubber medium, which method comprises adding to said medium an effective amount of a water soluble polyethyleneamine additive which contains at least one secondary amine moiety and two primary amine moieties, wherein the polyethyleneamine additive has the formula:

$$NH_2(CH_2CH_2NH)_xH$$

wherein X is 2 to about 10.

2. A method according to claim 1 wherein the polyethyleneamine additive is added at a dosage of about 0.5 to 100 parts of additive per million parts of scrubber medium.

3. A method according to claim 2, wherein the polyethyleneamine additive is added at a dosage of about 1 to 10 parts of additive per million parts of scrubber medium.

4. A method according to claim 2, wherein at the time of addition of said additive, the scrubber medium has a pH of about 4.5 to 7.5.

5. A method according to claim 2, wherein the scrubber medium is an aqueous slurry.

6. A method according to claim 5, wherein the solids in the slurry comprise fly ash in an amount of from about 100 to 20,000 parts of solids per million parts of aqueous slurry.

7. A method according to claim 6, wherein the additive is an aqueous solution of the polyethyleneamine and polyethylene glycol thermal stabilizer.

8. A method according to claim 7, wherein the additive comprises:

13.3% tetraethylenepentamine,
13.3% polyethylene glycol, and
73.4% water.

9. A method for reducing the amount of oxidation of sulfite to sulfate in an aqueous medium containing sulfite at a pH greater than 4.5, which method comprises adding to said aqueous medium an effective amount of a water soluble polyethyleneamine containing at least one secondary amine moiety and two primary amine moieties, wherein the polyethyleneamine additive has the formula:

$$NH_2(CH_2CH_2NH)_xH$$

wherein X is 2 to about 10.

10. A method according to claim 9 wherein the polyethyleneamine additive is added at a dosage of about 0.5 to 100 parts of additive per million parts of aqueous medium.

11. A method according to claim 10, wherein the additive is added at a dosage of about 1 to 10 parts of additive per million parts of aqueous medium.

12. A method according to claim 11, wherein at the time of addition of the additive, the medium is acidic.

* * * * *